April 25, 1950 H. R. SHAW 2,505,367
TELEVISION RECEIVER BRIGHTNESS AND CONTRAST CONTROL
Filed May 21, 1948
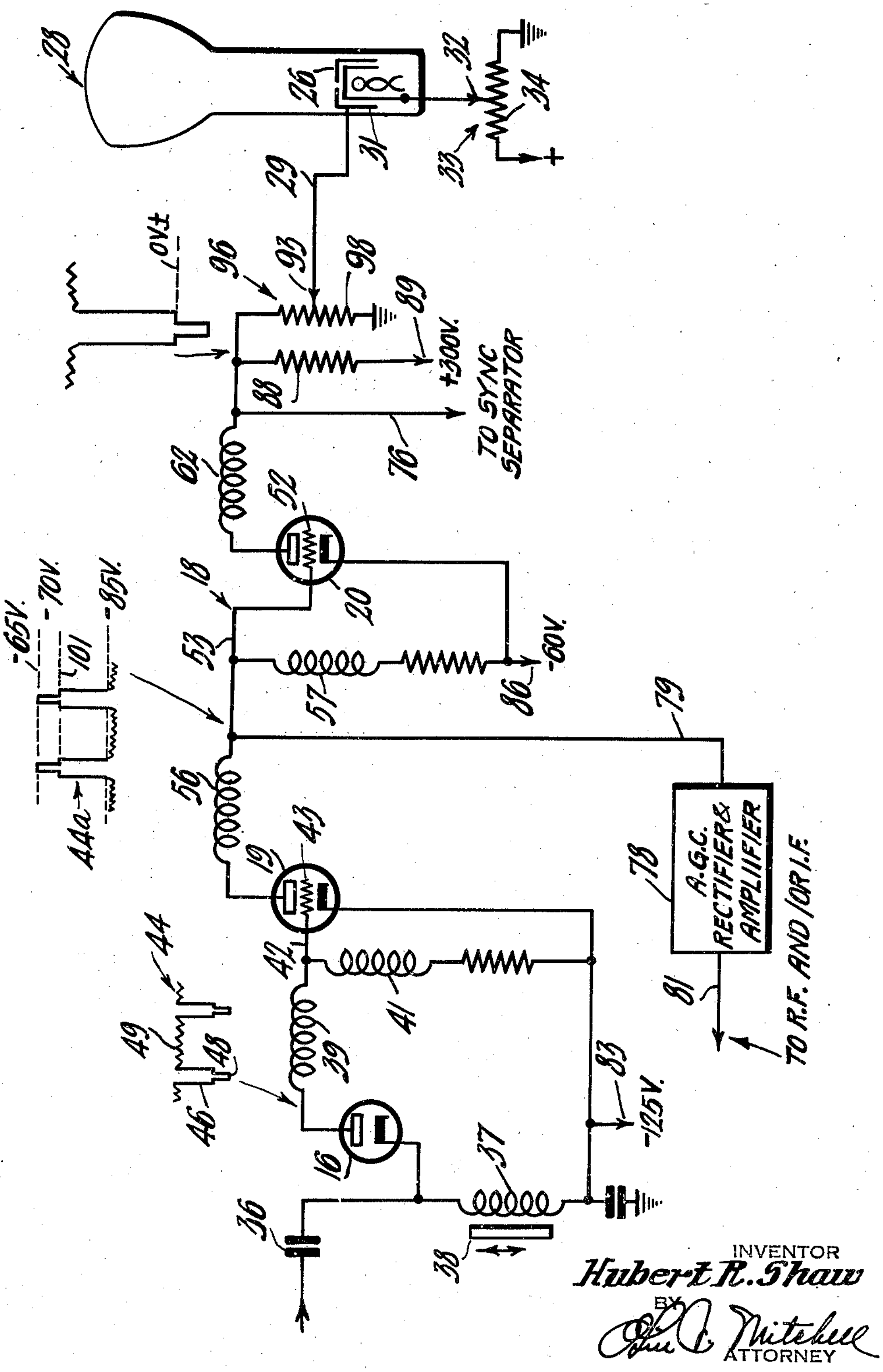
INVENTOR
Hubert R. Shaw
BY
[signature]
ATTORNEY Patented Apr. 25, 1950

2,505,367

UNITED STATES PATENT OFFICE 2,505,367

TELEVISION RECEIVER BRIGHTNESS AND CONTRAST CONTROL

Hubert R. Shaw, Drexel Hill, Pa., assignor to Radio Corporation of America, a corporation of Delaware Application May 21, 1948, Serial No. 28,376

3 Claims. (Cl. 178—7.5)

The present invention relates to television receivers and more particularly, but not necessarily exclusively, to improvements in the video channel of a television receiver whereby improved control of the operation of the image producing device is provided.

The general aim or object of the present invention is to provide novel means for obtaining the desired contrast and brightness of a luminous image in a television receiver which is produced under control of a video signal. In accordance with the invention, the video amplifier, or at least one stage of the video amplifier, amplifies the D. C. (direct current) component of the video signal. To this end, the amplifier is physically or conductively coupled to the image producing device of the receiver. The video signal in apparatus embodying the invention is preferably maintained at a desired level in any suitable way, for example, by an automatic gain control device. Contrast and brightness are then controllable in accordance with the invention by a single control which acts on the input to the image producing device.

Another aim or object of the invention is to provide novel means for setting the black level or input level for the darkest part of a scene, object or piece of scanned subject matter.

A further aim or object of the invention, referred to above in broader terms, is to provide a novel signal setting device which can be set to select a desired brightness of the produced image in a television receiver while maintaining its apparent contrast.

A still further object is to provide, in a novel manner, for obtaining an image tube input signal having a substantially fixed but adjustable limit and which varies from the limit through a desired range.

Other objects and advantages of the present invention will, of course, become apparent and immediately suggest themselves to those skilled in the art to which the invention is directed from a reading of the following specification in connection with the accompanying drawing which shows, diagrammatically, one suitable form of television apparatus embodying the invention.

Referring now to the drawing, there is illustrated a portion of a television receiver of a suitable kind, for example, of the superheterodyne type, comprising the usual first detector, a tunable oscillator, and an intermediate frequency (I. F.) amplifier, none of which are shown as they are not a part of the present invention. The signal receiving equipment, just mentioned, or its equivalent, provides a signal for a video demodulator or second detector 16 shown, by way of example, as a diode. The output of the second detector 16 is physically connected to a video amplifier 18, shown by way of example as comprising two physically connected tubes 19 and 20. The output of the tube 20 is applied by way of a physically connected coupling arrangement, having important features of this invention, to the control electrode 26 of an image producing cathode ray tube 28, shown schematically and by way of example. This image producing tube may be a "Kinescope" having appropriate image producing characteristics. The physically connected coupling arrangement between the tube 20 and the control electrode 26 of the image producing device includes a connection 29 and associated circuits which will be described more in detail, hereinafter. The cathode 31 of the image producing tube 28 is connected to the movable contact 32 of a potentiometer 33. The resistor 34 of this potentiometer is connected between a reference point of the circuit, such as the ground, and a suitable point of positive potential on a voltage supply source (not shown).

The output from the I. F. amplifier is delivered to the second detector 16 through a blocking condenser 36 and a tunable impedance, for example, the inductance 37 which is tunable by a movable magnetic core 38 of powdered iron or the like. It will be understood that a resonant circuit may exist and serve as the coupling means between the I. F. amplifier and the second detector 16. This resonant circuit, if it is present in the receiver which embodies this invention, includes the tunable inductance 37, the interelectrode capacity of the last stage tube (not shown) and the I. F. amplifier, and other circuit capacities including the second detector 16.

Series and shunt peaking coils 39 and 41 are arranged in the detector circuit from between which the demodulated output is applied by way of a physical or conductive connection 42 to the grid 43 of the tube 19. The output of the second detector being taken from the anode of the tube 16 provides that sync polarity is in the negative direction as shown conventionally by the wave form 44 above the coil 39. The output signal from the second detector 16 includes blanking signals 46 and horizontal or line sync pulses 48 as well as the image signal portion 49 of a composite signal applied to the television receiver. It will be understood that at appropriate intervals vertical or field sync pulses (not shown) will occur.

The output of the tube 19 is directly coupled to the grid 52 of the tube 20 through a physical or conductive coupling 53. Series and shunt peaking coils 56 and 57 respectively may be included in a coupling network between tube 19 and the grid 52 of the tube 20, if desirable or necessary, in order to avoid loss of high frequency components of the signal. The signal appearing at the grid 52 of the tube 20 is substantially a replica of the plate-current wave of the tube 19 but is a voltage wave 44*a* in the positive direction.

The plate circuit of the tube 20 includes a series peaking coil 62 and signal output from the tube 20 is of such polarity as to produce cut-off of the image tube 28 upon occurrence of blanking signals 48. A portion of the composite video signal output is taken off over a connection 76 and is applied to a sync separator (not shown) which provides a separated sync signal suitable for operating appropriate components of the apparatus (not shown) for producing a scanning action of the cathode ray beam in the image tube 28.

To secure operation of the illustrated television receiver in the most effective manner for purposes of the invention, an automatic gain control (A. G. C.) system is provided. The A. G. C. system is shown conventionally at 78, and its input connection 79 is preferably in communication with a suitable point in the television apparatus so that the demodulated video signal is supplied to it. In the illustrative example, the connection 79 is taken from the output of the first stage tube 19 of the video amplifier 18. The control signal derived, or generated, in operation of the A. G. C. system appears in a connection 81, which is in suitable communication with the I. F. and R. F. amplifier, or either one. A suitable A. G. C. system is disclosed in Martinelli Patent No. 2,296,393, granted September 22, 1942. A preferred A. G. C. system is disclosed in a copending application of Edwin L. Clark, Serial No. 613,772, filed August 31, 1945 and entitled "Automatic gain control system."

The electrodes of the successive tube in the amplifier stages are connected to a suitable voltage source as indicated schematically on the drawing. Inasmuch as the amplifier 18, having a direct current interstage coupling, is physically or conductively coupled to the detector 16 and the image producing tube 28, the electrodes of the tubes are connected to the voltage sources (not shown) having different values. The voltage values are assumed solely for illustrative purposes and convenience in describing the invention and its operation. For example, the cathodes of the detector 16 and the amplifier tube 19 are indicated as being connected to a negative potential point 83 on the voltage supply source. Solely by way of example, this voltage is indicated as being −125 volts. The anode of the first stage amplifier tube 19 is indicated as being connected to a point 86 on the voltage supply source, which is positive with respect to the connection of the cathodes of the first two tubes just mentioned. Solely by way of example, this voltage is indicated as being −65 volts. The anode of the amplifier tube 19 is, therefore, positive with respect to its cathode. The anode of the second stage tube 20 of the video amplifier is indicated as being connected through a resistor 88 to a point 89 of positive potential on the voltage supply source. Solely by way of example, this point is indicated as being +300 volts with respect to ground or some other voltage reference point in the receiver. The method of connecting voltage supply sources and the like, and tube electrodes in a direct-coupled amplifier is by now well known, and it is believed that the diagrammatic indication given in the drawing will be sufficient to indicate the nature of the tube circuits employed to those skilled in the art. The connection 29 to the grid 26 of the image producing tube 28 is also connected to the movable contact 93 of a potentiometer 96, the resistance element 98 of which is connected between a voltage reference point in the receiver circuit, such as ground, and to the end of the resistor 88 which is in communication with the anode of the tube 20.

The operation of the system, including the invention, will now be described. The reference to voltage levels in the following is solely for convenience of description. Voltage values and the sign of each voltage will be determined by the apparatus selected for carrying out the invention and the voltage reference point for the circuits. In the illustrative example, ground is selected as the voltage reference point. The instantaneous voltage on the grid 52 of the video amplifier tube 20 is, for example, −70 v. at the black level, indicated by the dotted line 101 on the diagram above this amplifier stage. The grid to cathode voltage is then, for example, −10 v. The A. G. C. system maintains the black level by maintaining the instantaneous plate voltage of the first video amplifier at a selected level on the tips of sync. The instantaneous plate voltage of the first video amplifier tube 19 may be about −65 v. as indicated on the tips of sync. The resistor 88 is so selected that the plate voltage of the second video amplifier tube 20 upon occurrence of the black level is at approximately the potential of the reference point in the system, such as ground. At the black signal level, therefore, there is practically no voltage drop across the resistor 98 of the potentiometer 96, and with the contact 32 of the potentiometer 33 properly adjusted, the image producing tube 28 is dark at all settings of the contact point 93.

On a dead-white picture element, that is to say when substantially no carrier is being received and supplied to the detector tube 16, the plate current of the tube 20 is low, and its plate voltage in the illustrative example is approximately +75 v. with respect to the circuit voltage reference point, such as ground. The brightness of the image producing tube on a dead-white image element is, therefore, dependent upon the setting of the contact point 93. The operation of the television receiver is thus simplified since, once the potentiometer contact 32 has been adjusted properly, combined control of both brightness and contrast of the produced images is obtained by adjustment of the single control 93.

Solely by way of example and for the sake of completeness of description, suggested values for the more important resistors will be indicated. With the voltages suggested by way of example in the foregoing and employing a type 6K6 tube in the second video amplifier stage, which is represented by the tube 20 in the illustrative example, the resistor 88 may be in the neighborhood of 10,000 ohms. The potentiometer resistor 98 may have a value of 2,200 ohms.

Having now described the invention, what is claimed and desired to be secured by Letters Patent is the following:

1. In a television receiver, an amplifier having input and output circuits, means for applying voltages to said circuits, an image producing tube, control means for said image producing tube, said amplifier output circuit including a load resistor, a potentiometer connected from said load resistor to a potential reference point for said amplifier circuits, means to maintain recurring signal level at the input of said amplifier, and means whereby said potentiometer connection to said load resistor has the same voltage as said voltage reference point for the amplifier circuits upon occurrence of said recurring signal level.

2. In a television receiver, an amplifier having input and output circuits, means for applying voltages to said circuits, an image producing tube, control means for said image producing tube, said amplifier output circuit including a load resistor, a potentiometer connected from said load resistor to a potential reference point for said amplifier circuits, means to maintain a recurring signal level at the input of said amplifier, and means whereby said potentiometer connection to said load resistor has the same voltage as said voltage reference point for the amplifier circuits upon occurrence of said recurring signal level.

3. In a television receiver, a physically coupled amplifier, an image producing tube having a cathode and a control electrode, control means for both the cathode and control electrode of said image producing tube, said amplifier having output means for connection to the control means for the control electrode of said image producing tube, means for applying a voltage to said output means, said control means for the control electrode of said image producing tube being in direct communication with the voltage reference point for the connections to said amplifier, means to maintain a predetermined signal level at the input to said amplifier, means for applying a voltage at the input of said amplifier, and means whereby said control means for the control electrode of said image producing tube is effective to set a selected range of values between a black value and a white value of the signal at the input to said amplifier.

HUBERT R. SHAW.

REFERENCES CITED

The following references are of record in the file of this patent:

UNITED STATES PATENTS

| Number | Name | Date |
|---|---|---|
| 2,246,331 | White | June 17, 1941 |
| 2,251,677 | Holmes | Aug. 5, 1941 |
| 2,430,699 | Berkoff | Nov. 11, 1947 |
| 2,443,864 | MacAuley | June 22, 1948 |

FOREIGN PATENTS

| Number | Country | Date |
|---|---|---|
| 90,674 | Sweden | Nov. 2, 1937 |
| 505,899 | Great Britain | May 15, 1939 |